(12) United States Patent
Sun et al.

(10) Patent No.: US 11,561,351 B2
(45) Date of Patent: *Jan. 24, 2023

(54) OPTICAL MODULE

(71) Applicant: InnoLight Technology (Suzhou) LTD., Jiangsu (CN)

(72) Inventors: Yuzhou Sun, Jiangsu (CN); Long Chen, Jiangsu (CN); Dengqun Yu, Jiangsu (CN); Weilong Lee, Jiangsu (CN)

(73) Assignee: InnoLight Technology Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/685,119

(22) Filed: Nov. 15, 2019

(65) Prior Publication Data
US 2020/0081205 A1    Mar. 12, 2020

Related U.S. Application Data

(63) Continuation of application No. 16/024,963, filed on Jul. 2, 2018, now Pat. No. 10,495,832.

(30) Foreign Application Priority Data

Jul. 19, 2017 (CN) .......................... 201710591788.1

(51) Int. Cl.
G02B 6/42 (2006.01)
(52) U.S. Cl.
CPC ........... *G02B 6/4256* (2013.01); *G02B 6/428* (2013.01); *G02B 6/4269* (2013.01); *G02B 6/421* (2013.01);
(Continued)

(58) Field of Classification Search
CPC ...... G02B 6/4256; G02B 6/421; G02B 6/428; G02B 6/4269; G02B 6/4284; G02B 6/4292
(Continued)

(56) References Cited

U.S. PATENT DOCUMENTS

| 4,119,363 A | 10/1978 | Camlibel et al. |
| 5,202,943 A * | 4/1993 | Carden ................ G02B 6/4246 385/92 |

(Continued)

FOREIGN PATENT DOCUMENTS

| CN | 202434505 U | 9/2012 |
| CN | 102129101 B | 10/2012 |

(Continued)

*Primary Examiner* — Tina M Wong
(74) *Attorney, Agent, or Firm* — Finnegan, Henderson, Farabow, Garrett & Dunner, LLP

(57) ABSTRACT

An optical module includes: a housing, a heat sink arranged in the housing, a laser emitter arranged on the heat sink, a PCB partially arranged on the heat sink, and an optical system arranged in the housing. The optical module has an optical interface on one end and an electrical interface on the other end. The optical system is arranged between the laser emitter and the optical interface. The PCB is constructed as a rigid board. The laser emitter is electrically connected to the PCB. One end of the PCB is fixed on the heat sink, and the other end of the PCB is constructed as the electrical interface. The optical system transmits light emitted from the laser emitter to the optical interface.

27 Claims, 8 Drawing Sheets

(52) U.S. Cl.
CPC .......... *G02B 6/4246* (2013.01); *G02B 6/4284* (2013.01); *G02B 6/4292* (2013.01)

(58) Field of Classification Search
USPC .......................................................... 385/92
See application file for complete search history.

(56) References Cited

U.S. PATENT DOCUMENTS

| | | | |
|---|---|---|---|
| 6,773,532 | B2 | 8/2004 | Wolf et al. |
| 9,496,959 | B1 | 11/2016 | Nagarajan et al. |
| 9,548,817 | B1 | 1/2017 | Nagarajan et al. |
| 9,641,254 | B1* | 5/2017 | Shen .................. H04B 10/801 |
| 10,018,794 | B2 | 7/2018 | Sun et al. |
| 10,171,170 | B2 | 1/2019 | Luo et al. |
| 10,495,832 | B2* | 12/2019 | Sun ...................... G02B 6/4269 |
| 2003/0026556 | A1 | 2/2003 | Mazotti et al. |
| 2003/0159772 | A1* | 8/2003 | Wolf .................... G02B 6/4277 156/182 |
| 2005/0259994 | A1* | 11/2005 | Zhang ................ H05K 9/0058 398/164 |
| 2008/0166085 | A1 | 7/2008 | Ito et al. |
| 2009/0067849 | A1 | 3/2009 | Oki et al. |
| 2010/0061683 | A1* | 3/2010 | Sasaki ................. G02B 6/4214 385/88 |
| 2010/0232748 | A1 | 9/2010 | Zeng |
| 2012/0207427 | A1* | 8/2012 | Ito ....................... G02B 6/4261 385/14 |
| 2013/0001410 | A1 | 1/2013 | Zhao et al. |
| 2013/0156386 | A1* | 6/2013 | Miller .................. G02B 6/4293 385/93 |
| 2014/0301703 | A1* | 10/2014 | Huang ................. G02B 6/4244 385/89 |
| 2014/0321821 | A1* | 10/2014 | Hsieh .................. G02B 6/4292 385/93 |
| 2014/0339290 | A1* | 11/2014 | Han ....................... H01L 24/49 228/180.5 |
| 2014/0341513 | A1* | 11/2014 | Lin ....................... G02B 6/4272 385/89 |
| 2015/0010310 | A1 | 1/2015 | Chien et al. |
| 2015/0131255 | A1* | 5/2015 | Do ........................ H05K 3/4697 361/783 |
| 2015/0304053 | A1 | 10/2015 | Pfnuer et al. |
| 2015/0323738 | A1* | 11/2015 | Sekiguchi .......... G02B 6/12002 385/14 |
| 2016/0109664 | A1* | 4/2016 | Chang .................... G02B 6/425 385/33 |
| 2016/0198586 | A1 | 7/2016 | Bouda |
| 2016/0238794 | A1* | 8/2016 | Tang ........................ G02B 6/32 |
| 2017/0031117 | A1* | 2/2017 | Nagarajan ............ G02B 6/4292 |
| 2017/0090132 | A1* | 3/2017 | Nagarajan ............ H04B 10/40 |
| 2017/0131488 | A1* | 5/2017 | Yu ......................... G02B 6/421 |
| 2017/0131489 | A1* | 5/2017 | Tsai ..................... G02B 6/4214 |
| 2017/0261703 | A1* | 9/2017 | Bowen ................ G02B 6/4214 |
| 2018/0164515 | A1* | 6/2018 | Amit .................. G02B 6/29365 |
| 2018/0267263 | A1* | 9/2018 | Wang .................. G02B 6/4214 |
| 2018/0278329 | A1* | 9/2018 | Chou ..................... G02B 6/428 |
| 2019/0377141 | A1* | 12/2019 | Chen ................... G02B 6/4244 |

FOREIGN PATENT DOCUMENTS

| | | |
|---|---|---|
| CN | 202513440 U | 10/2012 |
| CN | 103364897 A | 10/2013 |
| CN | 203838377 U | 9/2014 |
| CN | 104111503 A | 10/2014 |
| CN | 104678515 A | 6/2015 |
| CN | 104730656 A | 6/2015 |
| CN | 105022128 A | 11/2015 |
| CN | 105549163 A | 5/2016 |
| CN | 205232234 U | 5/2016 |

* cited by examiner

OPTICAL MODULE

CROSS-REFERENCE TO RELATED APPLICATION

This application is a continuation of application Ser. No. 16/024,963, filed Jul. 2, 2018 (allowed), which is based upon and claims priority to Chinese Patent Application 201710591788.1, filed on Jul. 19, 2017, the entire content of all of which are incorporated herein by reference.

FIELD OF THE DISCLOSURE

The present disclosure relates to the field of optical communication technology and, more particularly, to an optical module.

BACKGROUND

With the development of society, the amount of data is increasing. This requires that optical communication modules transmit data at a faster speed and cost less. Existing 3G technology is unable to meet the complex needs of users and markets. TD-LTE (Time Division-Long Term Evolution, long-term evolution of TD-SCDMA) has emerged as a technology that paves the way from 3G to 4G. Due to the current shortage of optical fiber resources, high cost of new installations, and relatively long distances between base stations, the demand for small form-factor pluggable (SFP+) packaged optical modules has been gradually increasing.

Generally, in an optical module, electrical signals enter a PCBA (Printed Circuit Board Assembly) from gold contact fingers and are then outputted to an optoelectronic chip, which converts the electrical signals into optical signals and output them to an optical port through an optical system. The optical port and the electrical interface (gold contact fingers) are both fixed relative to a housing of the optical module. In general, the PCBA is rigid, the optical system is rigid, and all devices have certain dimensional tolerances.

Most optical module packaging technologies now use a flexible circuit board (FPC) to absorb assembly tolerances. But the solder joints between the flexible circuit board and the PCBA introduce relatively large electrical signal attenuation. Therefore, such optical module packaging technologies can only be used for transmission rates below 10G.

With higher transmission rates, the design of optical modules for long-distance transmission requires smaller attenuation of high-speed electrical signals. At the same time, to meet the assembly requirements of the optical module, it is necessary to assemble the gold contact fingers, PCBA, optoelectronic chip, free-space optical path assembly, and optical port. Thus, a problem that needs to be resolved is how to integrate the design for best conversion between and transmission of optical and electrical signals.

SUMMARY

A purpose of the present disclosure is to provide an optical module, which enables better transmission of high-speed signals.

Consistent with the aforementioned purpose, the present disclosure provides an optical module, which includes a housing, a heat sink arranged in the housing, a laser emitter arranged on the heat sink, a PCB partially arranged on the heat sink, and an optical system arranged in the housing. The optical module has an optical interface on one end and an electrical interface on the other end. The optical system is arranged between the laser emitter and the optical interface. The PCB is constructed as a rigid board. The laser is electrically connected to the PCB. One end of the PCB is fixed on the heat sink, and the other end of the PCB is constructed as the electrical interface. The optical system transmits light emitted from the laser to the optical interface.

The optical module further includes an assembly tolerance absorbing assembly arranged at the optical interface. The assembly tolerance absorbing assembly transmits light emitted from the laser emitter through the optical system to a center of the optical interface or to an external connector connected to the optical module. Or the assembly tolerance absorbing assembly transmits light emitted from the laser emitter to the optical system.

The assembly tolerance absorbing assembly includes an optical element. The optical element is arranged between the optical system and the optical interface or between the optical system and the laser emitter. The optical element is used for realizing a connection of an optical path between the optical system and the optical interface or of an optical path between the optical system and the laser emitter.

The assembly tolerance absorbing assembly comprises an optical fiber that connects between the laser emitter and the optical system. The optical fiber transmits light emitted from the laser emitter to the optical system.

The heat sink includes a first heat sink and a second heat sink. The optical system is arranged on the first heat sink. The laser emitter is packaged on the second heat sink. An optical fiber fixing element is arranged on each of the first heat sink and the second heat sink.

The assembly tolerance absorbing assembly includes a connecting port and at least one optical fiber that optically connects the connecting port and the optical interface. The connecting port is fixed on the heat sink and is located between the optical system and the optical interface. The optical fiber transmits light emitted from the optical system to the optical interface.

The assembly tolerance absorbing assembly includes an adapter that is separately configured from the housing. The adapter is mated to the optical interface. After the adapter and the housing are adjusted into position, they are fixed together by means of glue, screw tightening, or soldering.

The optical system, optical interface, and circuit board are all fixed to the heat sink.

The adapter is connected to the housing along a direction parallel to a plugging direction of the optical interface. A gap for adjustment exists between the adapter and the housing in all directions perpendicular to the plugging direction.

The optical module further includes a driver that is used to drive the laser. The driver is packaged on the heat sink or the PCB.

The PCB is fixed to the heat sink by means of glue.

The optical interface includes a transmitting-end optical interface and a receiving-end optical interface. Light emitted from said laser is transmitted to the transmitting-end optical interface through the optical system. Optical signals received by the receiving-end optical interface is transmitted to the optical receiving end through the optical system.

DETAILED DESCRIPTION

The text below provides detailed descriptions of the present disclosure through referencing specific embodiments as illustrated in the attached drawings. However, these embodiments do not limit the present disclosure; the scope of protection for the present disclosure covers changes made to the structure, method, or function by persons of ordinary skill in the art on the basis of these embodiments.

Figure 1:
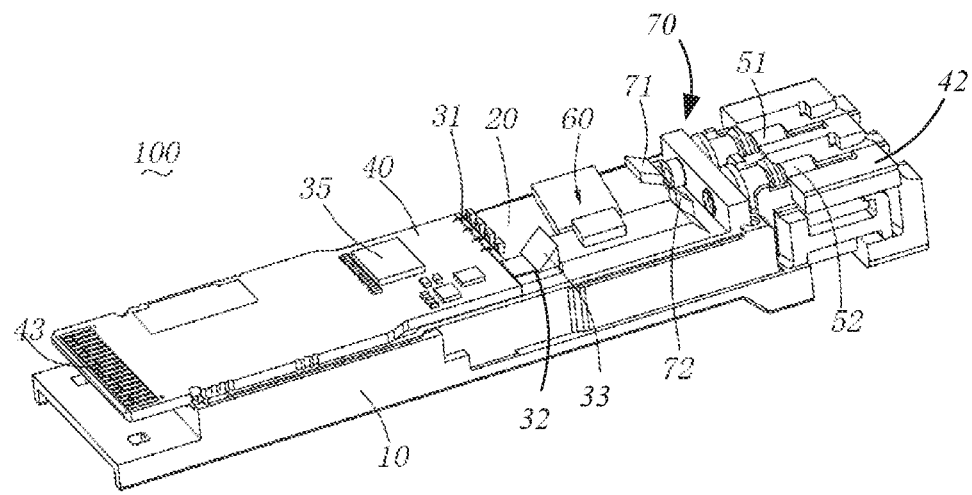
FIG. 1 is a three-dimensional drawing of an optical module in a first embodiment of the present disclosure.
Figure 2:
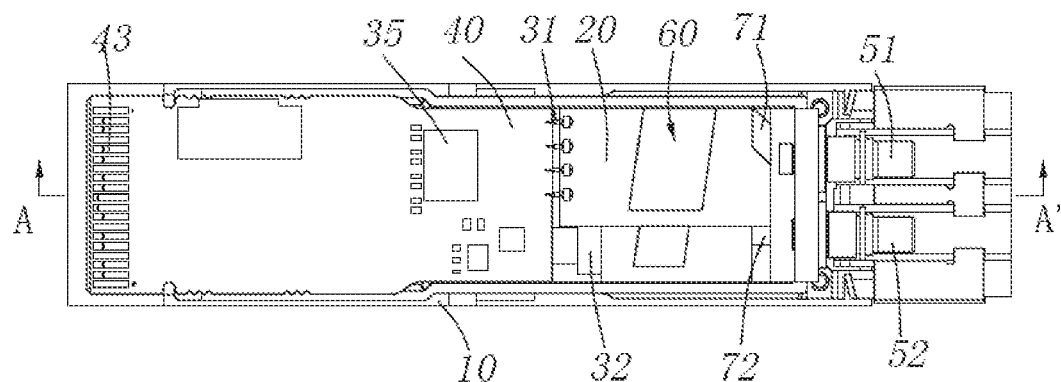
FIG. 2 is a top view of the optical module in FIG. 1.
Figure 3:
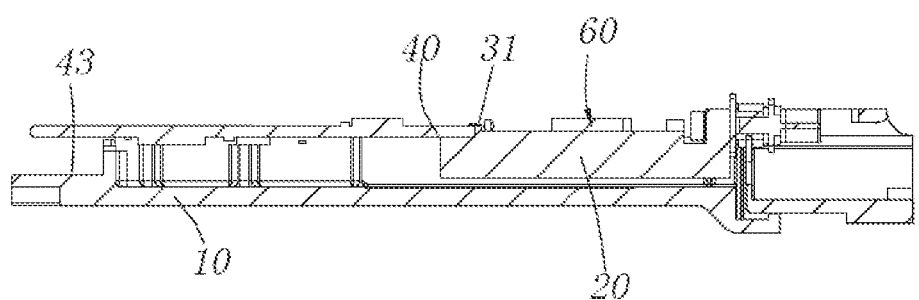
FIG. 3 is an A-A' section view of the optical module in FIG. 2.
Figure 4:
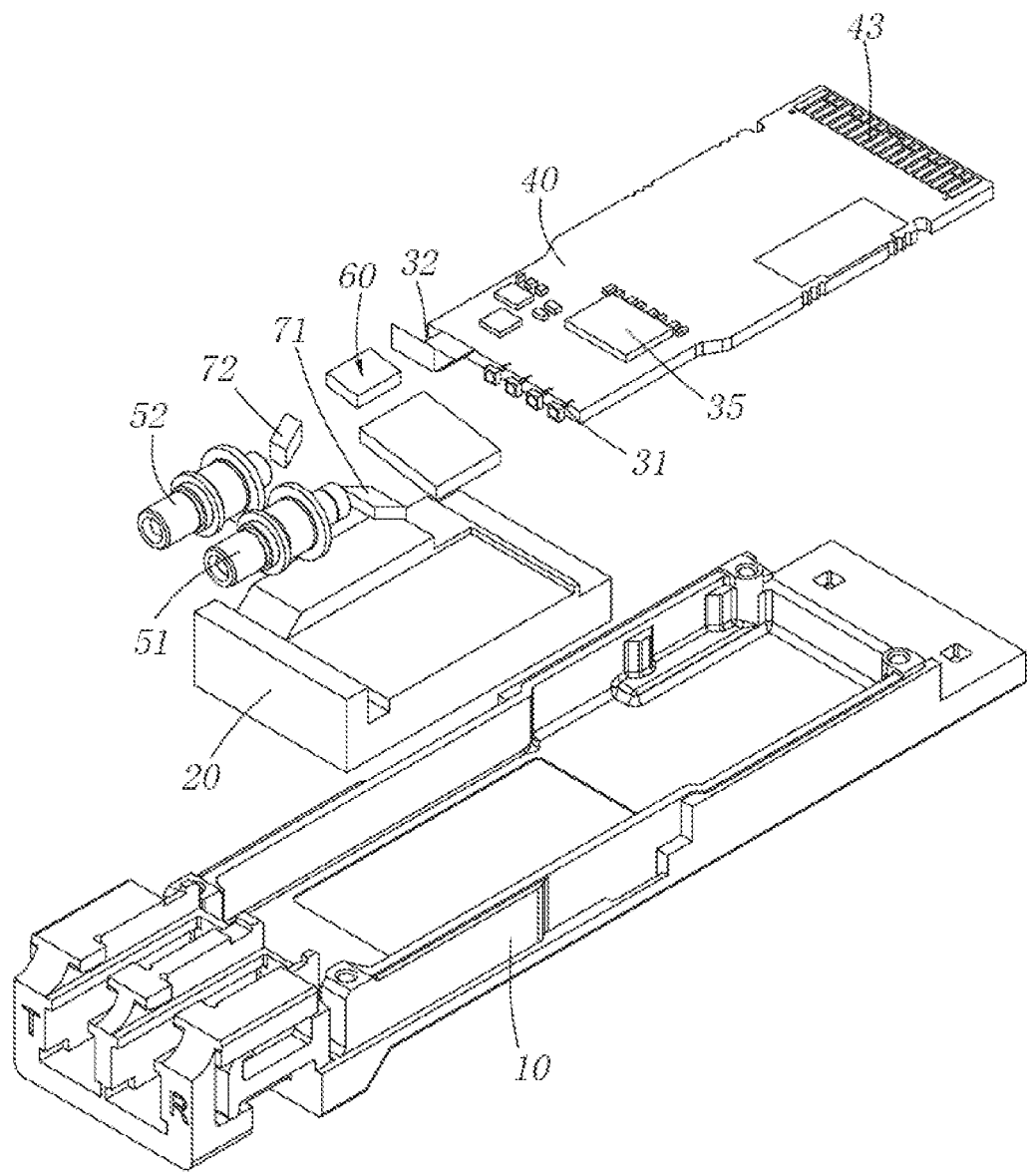
FIG. 4 is a three-dimensional exploded view of the optical module in FIG. 1.

FIG. 1 is a three-dimensional drawing of an optical module 100 in a first embodiment of the present disclosure. FIG. 2 is a top view of the optical module 100 in FIG. 1. FIG. 3 is a section view of the optical module 100 along line A-A' in FIG. 2. FIG. 4 is a three-dimensional exploded view of the optical module 100 in FIG. 1. Referring to FIGS. 1 through 4, in the first embodiment of the present disclosure, the optical module 100 includes a housing 10 (only the lower part of the housing is shown in the figures), a heat sink 20 arranged in the housing 10, a laser emitter 31 arranged on the heat sink 20, and a PCB (printed circuit board) 40 partially arranged on the heat sink 20. The optical module 100 has an optical interface 42 on one end and an electrical interface 43 on the other end. The optical interface 42 includes a transmitting-end optical interface 51 and a receiving-end optical interface 52. Here, the PCB 40 is constructed as a rigid board. One end of the PCB 40 is fixed on the heat sink 20 and is electrically connected to the laser emitter 31, and the other end of the PCB 40 is constructed as the electrical interface 43 of the optical module. Here, gold contact fingers are arranged on the other end of the PCB 40, and the gold contact fingers serve as the electrical interface 43 of the optical module 100.

The optical module 100 further includes an optical system 60 that is arranged in the housing 10 and is located between the laser emitter 31 and the optical interface 42. The optical system 60 may be at least partially arranged on the heat sink 20. A driver 35 of the laser emitter 31 is packaged on the PCB 40. The laser emitter 31 may be packaged directly on the heat sink 20, or it may be packaged on a pad of the heat sink 20. High-speed electrical signals are outputted from the driver 35 to the PCB 40 and then outputted over a very short distance via a gold wire to the laser emitter 31. The optical system 60 transmits light emitted from the laser emitter 31 to the optical interface 42. In other words, the laser emitter 31 at an optical transmitting end is optically coupled to the transmitting-end optical interface 51. Optical signals received by the receiving-end optical interface 52 are transmitted through the optical system 60 to an optical receiving end, which converts the optical signals it receives into electrical signals. In other words, the optical receiving end is optically coupled to the receiving-end optical interface 52 and at the same time electrically connected to the PCB 40. In the entire high-speed link, there is no flexible board soldered so that signal loss caused by solder joints is reduced. In addition, the distance between the laser emitter 31 and the PCB 40 is short enough to ensure optimal electrical performance. And, using the heat sink 20 as a base, all elements are fixed to the heat sink 20 so assembly tolerances are small, and heat can be dissipated via the heat sink 20, resulting in reliable performance and good heat dissipation.

The optical system 60 is arranged on one side of the laser emitter 31 and includes a lens assembly and a wavelength division multiplexer. The lens assembly includes at least one lens and is able to process, such as to focus or collimate, light emitted from the laser emitter 31 in order to adjust the direction of propagation of the emergent light beam from the laser emitter 31, and the wavelength division multiplexor can merge a plurality of separate beams of light into one beam of light, so that optical signals emitted from the laser emitter 31 can be transmitted through the lens assembly and the wavelength division multiplexer to the transmitting-end optical interface 51. The PCB 40 is horizontally arranged inside the housing 10 of the optical module 100. The optical receiving end may be packaged directly on the heat sink 20 or be packaged on a pad of the heat sink. Here, the laser emitter 31 includes a VCSEL (Vertical Cavity Surface Emitting Laser) chip, the optical receiving end includes a PD (photodiode) chip 32, and light transmitted from the receiving-end optical interface 52 passes through the wavelength division multiplexer and a reflective prism 33 before it reaches the PD chip 32. The VCSEL chip is soldered directly on the heat sink 20 and is electrically connected to the PCB 40 via a gold wire and is then electrically connected to the driver 35 packaged on the PCB 40. The PD chip 32 is also soldered directly on the heat sink 20. The laser emitter 31 may also include another type of laser chip. Similarly, the optical receiving end may also include a PIN chip, an ADP chip, or another detector chip. Additionally, the optical interface 42 may be constructed as one interface, which is configured to be a transmitting-end optical interface, a receiving-end optical interface, or a two-in-one interface. In other words, the optical module 100 may include a transceiving-end optical interface, which may be a transmitting-end optical interface, or a receiving-end optical interface, or both, or an integrated transceiving interface.

Further, in the first exemplary embodiment, the optical interface 42 is fixedly arranged relative to the housing 10, and the heat sink 20 is also fixed relative to housing 10. In order that assembly tolerances between the optical interface 42 and its corresponding laser emitter 31 and/or an optical receiver, which is the optical receiving end discussed above (here it is a photoelectric detector, i.e., the PD chip) can be absorbed, the optical module 100 further includes an assembly tolerance absorbing assembly 70, which is used to ensure that light emitted from the laser emitter 31 can be received by an external element connected to the optical module 100 and that light emitted from the external element connected to the optical module 100 can be transmitted well to the optical receiver. In other words, the assembly tolerance absorbing assembly 70 can transmit light emitted from the laser emitter 31 through the optical system 60 to a center of the optical interface 42 or to an external connector (not illustrated) connected to the optical module, or the assembly tolerance absorbing assembly 70 can transmit light emitted from the laser emitter 31 to the optical system 60. Here, the center of the optical interface 42 is an approximate central place. The center of the optical interface 42 is the place where the external connector receives optical signals after the external connector is connected to the optical module 100. The center of the optical interface 42 is also the place where the external connector transmits optical signals after the external connector is connected to the optical module 100. The external connector includes an optical fiber plug, a switch interface, etc.

Specifically, the assembly tolerance absorbing assembly 70 is arranged at the optical interface 42 and includes an optical element, which is arranged between the optical system 60 and the optical interface 42 and is used for realizing a connection of an optical path between the optical system 60 and the optical interface 42. The optical element includes a transmitting-end optical element 71 and a receiving-end optical element 72. The optical elements 71 and 72 may be lenses, plate glass, or reflective mirrors, or other elements that allow light to pass through and change the light's direction of propagation. By adjusting the optical path with these optical elements 71 and 72, light that enters the transmitting-end optical interface 51 is caused to be located at the center of the transmitting-end optical interface 51 and light that enters the optical module 100 from the receiving-end optical interface 52 can reach the optical receiver well. Optical elements may also be arranged between the optical system 60 and the laser emitter 31 and be used to connect the optical path between the optical system 60 and the laser emitter 31.

The first embodiment further discloses an assembly method for the aforementioned optical module 100. The assembly method includes the following steps: packaging the optical system 60, laser emitter 31, and the PD chip 32 at the optical receiving end onto the heat sink 20; fixing one end of the PCB 40 on the heat sink 20; fixing the heat sink 20 in the housing 10; and arranging the optical element 71 between the optical system 60 and the optical interface 42, and adjusting the optical element 71 so that the center of the optical path of the optical interface is aligned with the optical path of the laser emitter 31 and the optical path of the PD chip 32 at the optical receiving end.

Figure 5:
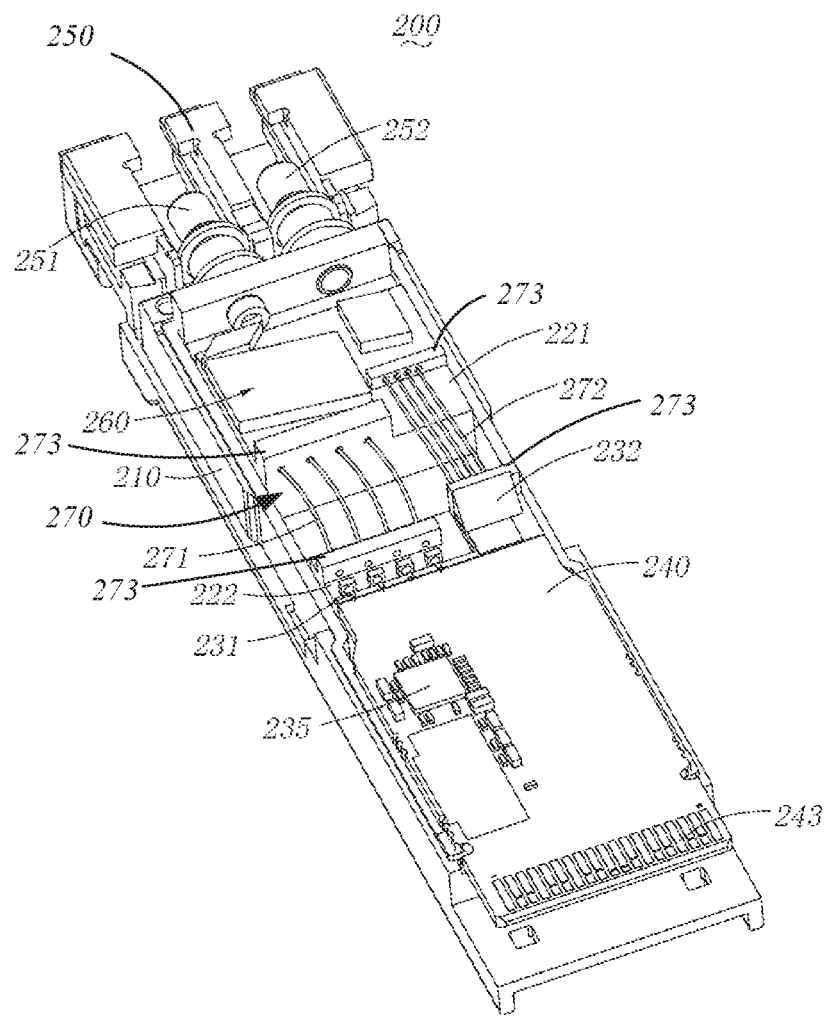
FIG. 5 is a three-dimensional drawing of an optical module in a second embodiment of the present disclosure.
Figure 6:
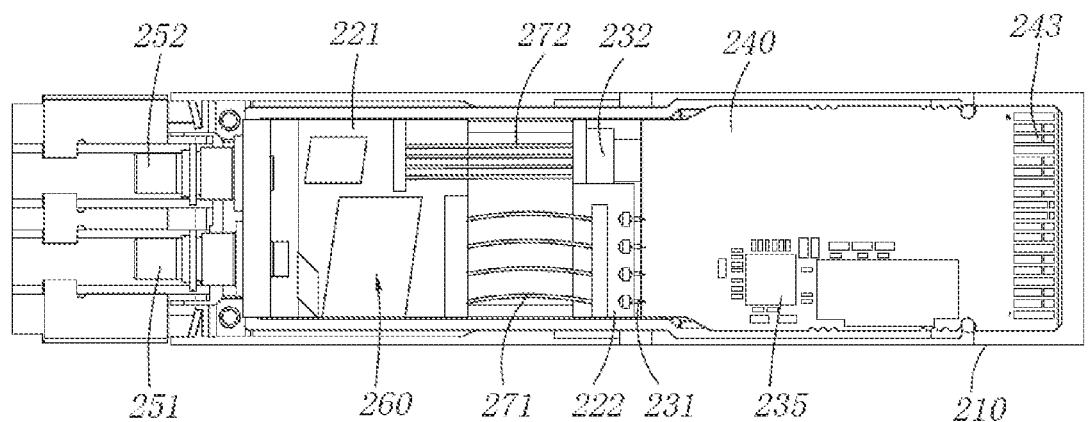
FIG. 6 is a top view of the optical module in FIG. 5.

FIG. 5 is a three-dimensional drawing of an optical module 200 in a second embodiment of the present disclosure. FIG. 6 is a top view of the optical module 200 in FIG. 5. Referring to FIGS. 5 through 6, in the second embodiment of the present disclosure, the optical module 200 similarly includes a housing 210, a heat sink 221/222 arranged in the housing, a laser emitter 231 arranged on the heat sink, and a PCB 240 partially arranged on the heat sink. The optical module 200 has an optical interface 250 on one end and an electrical interface 243 on the other end. The optical interface 250 includes a transmitting-end optical interface 251 and a receiving-end optical interface 252. Here, the PCB 240 is constructed as a rigid board. One end of the PCB 240 is fixed on the heat sink 221/222 and is electrically connected to the laser emitter 231, and the other end of the PCB 240 is constructed as the electrical interface 243 of the optical module 200. Gold contact fingers for pluggable connection to an external part are arranged on the electrical interface 243.

In the second embodiment, the heat sink 221/222 includes a first heat sink 221 and a second heat sink 222. An optical system 260 of the optical module 200 is arranged on the first sink 221. The laser emitter 231 and a PD chip 232 at an optical receiving end are packaged on the second heat sink 222. A driver 235 of the laser emitter 231 is packaged on the PCB 240. In the second embodiment, the optical interface 250 is fixedly arranged relative to the housing 210, and the first heat sink 221 and the second heat sink 222 are also fixed relative to housing 210. In order that assembly tolerances between the optical interface 250 and its corresponding laser emitter 231 and/or an optical receiver can be absorbed, an assembly tolerance absorbing assembly 270 of the optical module 200 is arranged between the optical system 260 and the laser emitter 231/the PD chip 232 at the optical receiving end. Specifically, the assembly tolerance absorbing assembly 270 includes at least one transmitting-end optical fiber 271 and at least one receiving-end optical fiber 272. An optical fiber fixing element 273 is arranged on each of the first heat sink 221 and the second heat sink 222, and the two ends of the optical fibers 271 and 272 are fixed by the optical fiber fixing elements 273. By connecting an optical path using the optical fibers 271 and 272, light emitted from the laser emitter 231 is transmitted to the optical system 260, or light received from the optical system 260 is transmitted to the optical receiving end. Because the optical fibers 271 and 272 are soft and flexible, tolerance may be absorbed by the optical fibers. In the second embodiment, the quantity of the optical fibers 271 and 272 is configured to be relevant to the structure of the optical module 200 and to the transmission speed. If the optical interface 250 of the optical module 200 is configured to be a single optical interface, then the quantity of corresponding optical fiber may be configured to be one. When the transmission speed requirement of the optical module 200 is relatively high, a plurality of laser emitters may be configured for the optical module, and the quantity of the optical fibers 271 and 272 is consistent with the quantity of the laser emitters. Tolerance is absorbed by the arrangement of a soft and flexible optical fiber so that the center of the optical path of the optical interface 250 is aligned with the laser emitter 231 at an optical transmitting end and the PD chip 232 at the optical receiving end.

The second exemplary embodiment further discloses an assembly method for the aforementioned optical module 200. The assembly method includes the following steps: packaging the optical system 260 onto the first heat sink 221; packaging the laser emitter 231 and the PD chip 232 at the optical receiving end onto the second heat sink 222; fixing one end of the PCB 240 on the second heat sink 222; fixing both the first heat sink 221 and the second heat sink 222 in the housing 210; and connecting an optical fiber between the optical system 260 and the laser emitter 231 and/or the PD chip 232 at the optical receiving end.

Figure 7:
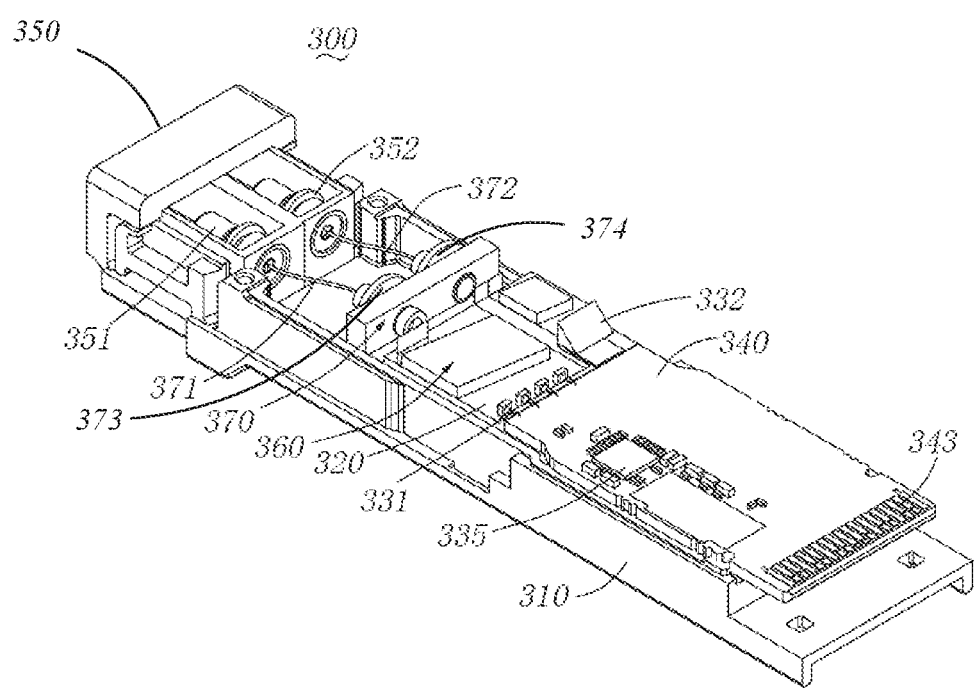
FIG. 7 is a three-dimensional drawing of an optical module in a third embodiment of the present disclosure.
Figure 8:
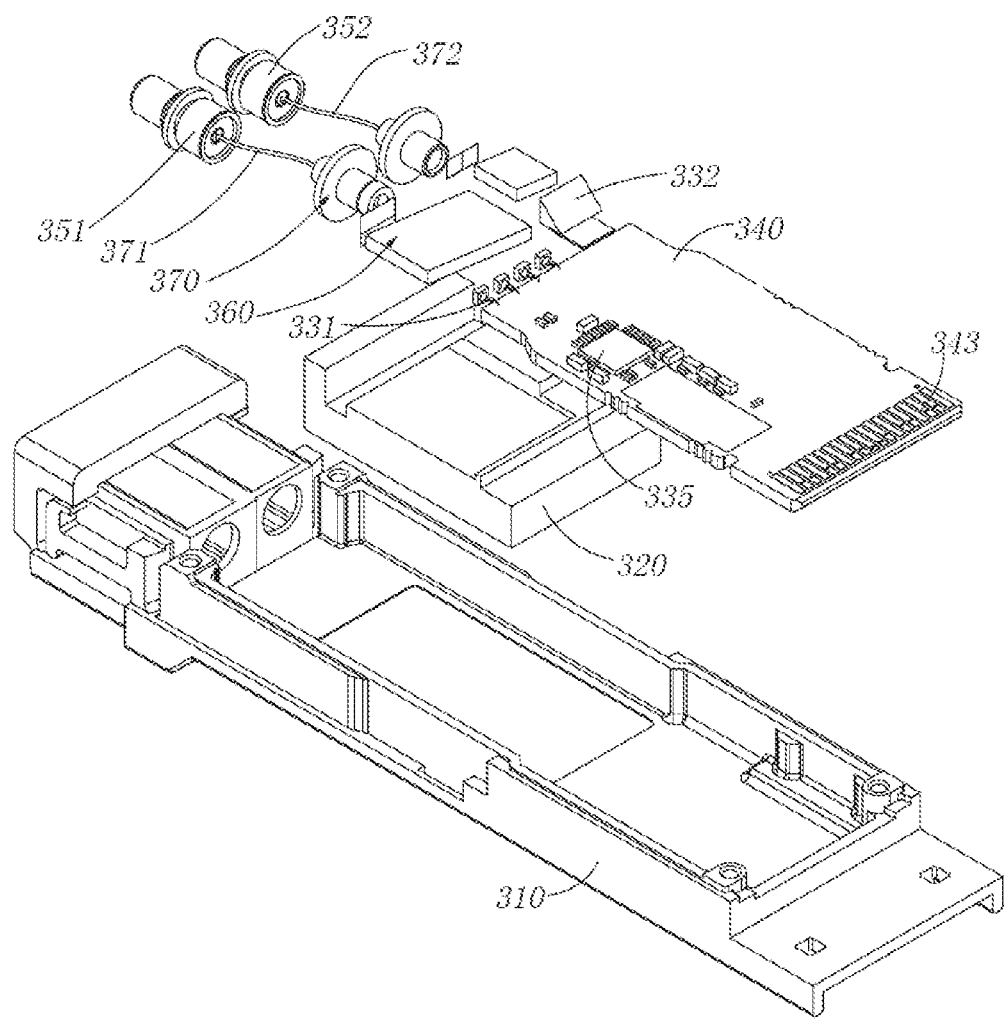
FIG. 8 is a three-dimensional exploded view of the optical module in FIG. 7.

FIG. 7 is a three-dimensional drawing of an optical module 300 in a third embodiment of the present disclosure. FIG. 8 is a three-dimensional exploded view of the optical module 300 in FIG. 7. Referring to FIGS. 7 through 8, in the third embodiment of the present disclosure, the optical module 300 includes a housing 310, a heat sink 320 arranged in the housing 310, a laser emitter 331 arranged on the heat sink, and a PCB 340 partially arranged on the heat sink 320. The optical module 300 has an optical interface 350 on one end and an electrical interface 343 on the other end, and the optical interface includes a transmitting-end optical interface 351 and a receiving-end optical interface 352. Here, the PCB 340 is constructed as a rigid board. One end of the PCB 340 is fixed on the heat sink 320 and is electrically connected to the laser emitter 331, and the other end of the PCB 340 is constructed as the electrical interface 343 of the optical module 300.

In the third embodiment, an optical system 360 of the optical module is arranged on the heat sink 320, a driver 335 of the laser emitter 331 is packaged on the PCB 340, the laser emitter 331 is packaged on the heat sink 320, and a PD chip 332 at an optical receiving end is also packaged on the heat sink 320. The optical system 360 includes a transmitting optical path and a receiving optical path. The transmitting optical path includes a wavelength division multiplexer, and the receiving optical path includes a wavelength division multiplexer and a reflective mirror. In the third embodiment, the optical interface 350 is fixedly arranged relative to the housing 310, and the heat sink 320 is also fixed relative to housing 310. In order that assembly tolerances between the optical interface 350 and its corresponding transmitting end and between the optical interface 350 and its corresponding receiving end can be absorbed, an assembly tolerance absorbing assembly of the optical module is arranged between the optical system 360 and the optical interface. Specifically, the assembly tolerance absorbing assembly includes a connecting port 370 and at least one optical fiber that connects the connecting port 370 and the optical interface 350. The connecting port 370 is fixed on the heat sink 320. Here, the connecting port 370 includes a transmitting connecting port 373 that corresponds to an optical transmitting end and a receiving connecting port 374 that corresponds to the optical receiving end. Therefore, the quantity of optical fibers is configured to be two, and these two optical fibers are, respectively, a first optical fiber 371 that connects between the transmitting-end optical interface 351 and the transmitting connecting port 373, and a second optical fiber 372 that connects between the receiving-end optical interface 352 and the receiving connecting port 374. The structure is made simple by using optical fibers 371 and 372 to connect the optical path, and, if one optical interface is configured, only one optical fiber needs to be configured to meet the requirement, resulting in low cost.

The present example embodiment further discloses an assembly method for the aforementioned optical module. The assembly method includes the following steps: packaging the optical system 360, the laser emitter 331, and the PD chip at the optical receiving end onto the heat sink 320; fixing the connecting port 370 onto the heat sink 320; fixing one end of the PCB 340 on the heat sink 320; fixing the heat sink 320 in the housing 310; and connecting an optical fiber between the connecting port 370 and the optical interface so that the center of the optical path of the optical interface is aligned with the optical path of the transmitting end and the optical path of the receiving end through the optical fiber.

Figure 9:
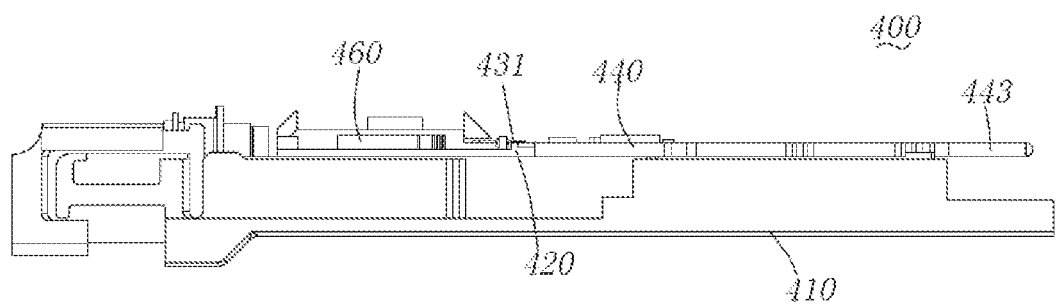
FIG. 9 is a front view of an optical module in a fourth embodiment of the present disclosure.
Figure 10:
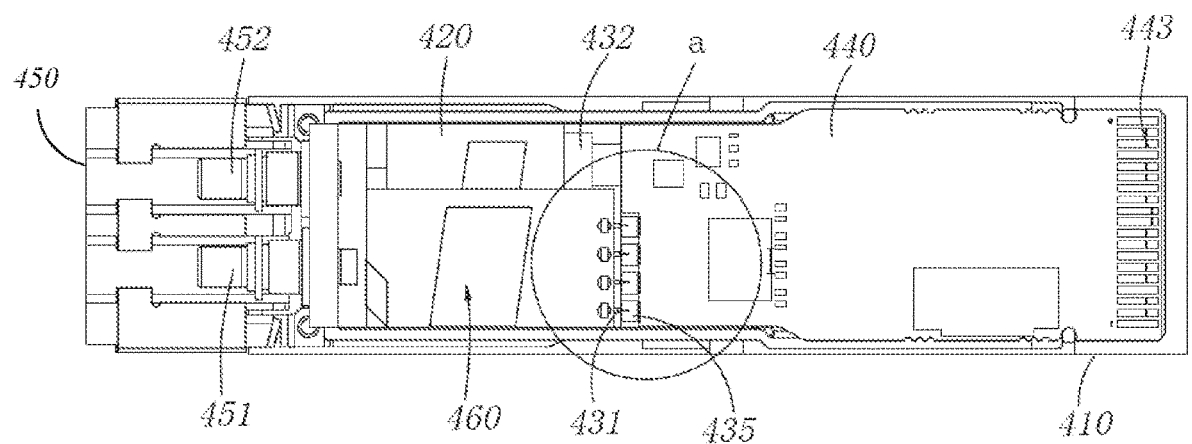
FIG. 10 is a top view of the optical module in FIG. 9.
Figure 11:
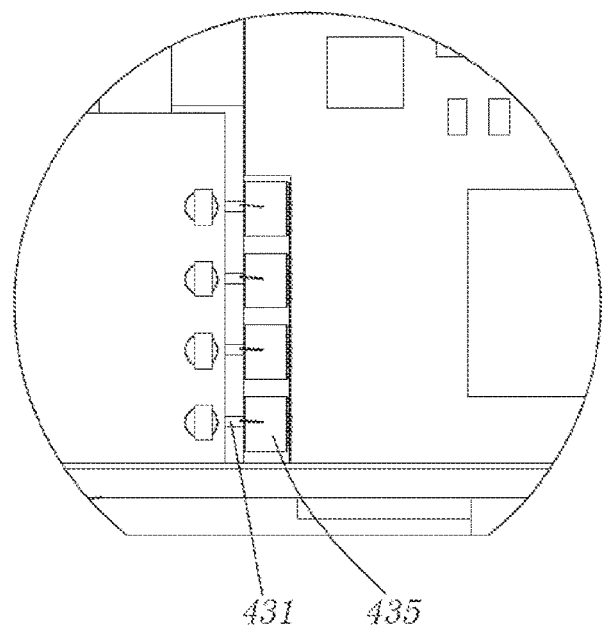
FIG. 11 is an enlarged view of the area "a" of the optical module in FIG. 10.

FIG. 9 is a front view of an optical module 400 in a fourth embodiment of the present disclosure. FIG. 10 is a top view of the optical module 400 in FIG. 9. FIG. 11 is an enlarged view of the area "a" of the optical module 400 in FIG. 10. Referring to FIGS. 9 through 11, in the fourth embodiment of the present disclosure, an optical module 400 similarly includes a housing 410, a heat sink 420 arranged in the housing 410, a laser emitter 431 arranged on the heat sink 420, and a PCB 440 partially arranged on the heat sink 420. The optical module 400 has an optical interface 450 on one end and an electrical interface 443 on the other end. The optical interface 450 includes a transmitting-end optical interface 451 and a receiving-end optical interface 452. Here, the PCB 440 is constructed as a rigid board. One end of the PCB 440 is fixed on the heat sink 420 and is electrically connected to the laser emitter 431, and the other end of the PCB 440 is constructed as the electrical interface 443 of the optical module 400. In the fourth embodiment, an optical system 460 of the optical module 400 is arranged on the heat sink 420. Both the laser emitter 431 and a driver 435 of the laser emitter 431 are packaged on the heat sink 420. A PD chip 432 at an optical receiving end is also packaged on the heat sink 420. The difference between the fourth embodiment and the first embodiment is that the driver 435 of the laser emitter 431 is also arranged on the heat sink 420 and is connected to the laser emitter 431 via a gold wire, and, at the same time, the driver 435 is also located on the edge of the PCB 440 and is also connected to the PCB 440 via a gold wire. The configuration of the other elements and components is essentially the same as that in the first embodiment. No redundant description is repeated in detail here.

Figure 12:
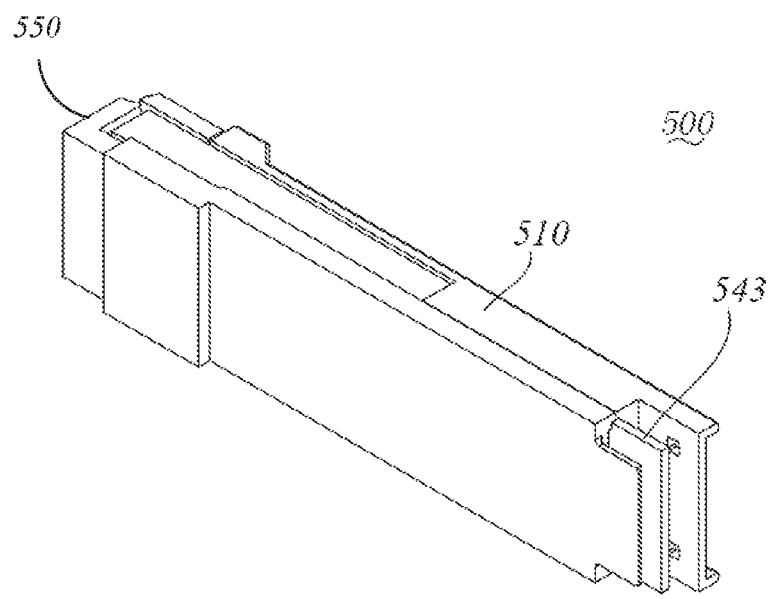
FIG. 12 is a three-dimensional diagram of an optical module in a fifth embodiment of the present disclosure.
Figure 13:
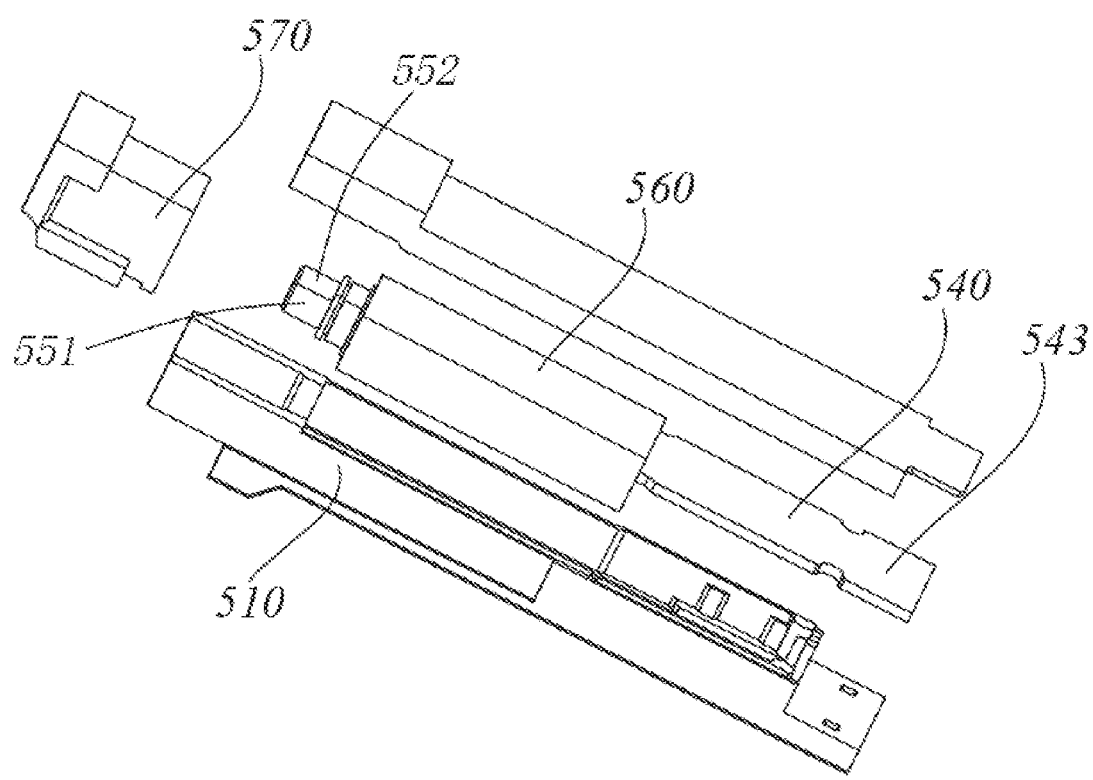
FIG. 13 is a three-dimensional exploded diagram of the optical module in FIG. 12.
Figure 14:
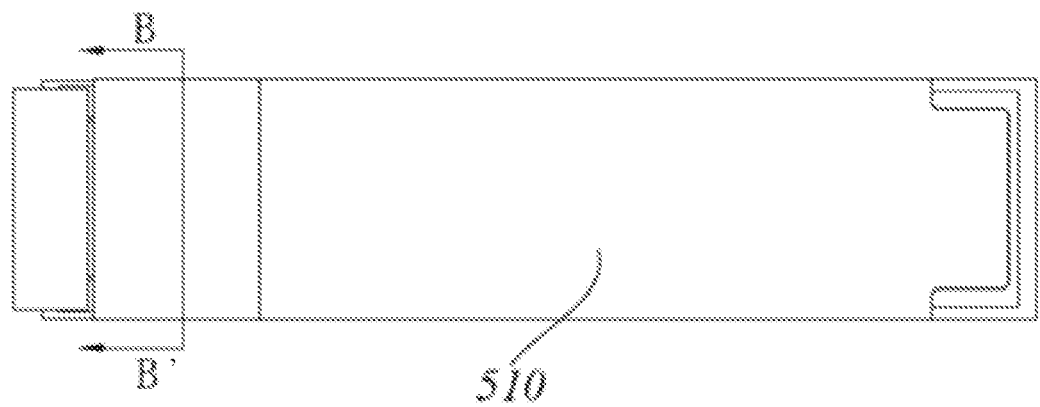
FIG. 14 is a front view of the optical module in FIG. 12.
Figure 15:
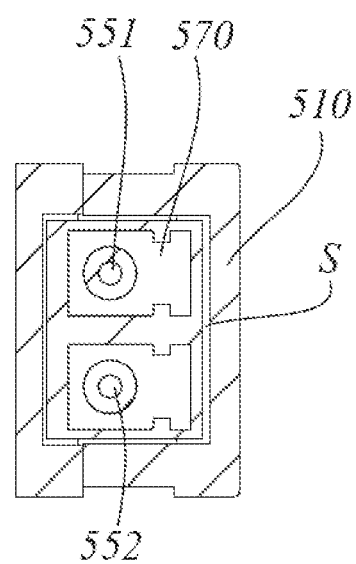
FIG. 15 is a B-B' section view of the optical module in FIG. 14.

FIG. 12 is a three-dimensional diagram of an optical module 500 in a fifth embodiment of the present disclosure. FIG. 13 is a three-dimensional exploded diagram of the optical module 500 in FIG. 12. FIG. 14 is a front view of the optical module 500 in FIG. 12. FIG. 15 is a section view of the optical module 500 along line B-B' in FIG. 14. Referring to FIGS. 12 through 15, in the fifth embodiment of the present disclosure, the optical module 500 includes a housing 510 and a PCB 540 that is arranged in the housing. An accommodating space is arranged in the housing 510, and the PCB 540 is arranged in the accommodating space. The PCB 540 may be snap-fitted to the housing 510. The PCB 540 may be fixed to the housing 510 by screws. Alternatively, like in a previous embodiment, the PCB 540 has one end fixed on a heat sink and is then fixed relative to the housing 510 via the heat sink. Still alternatively, another connection method may be used. The PCB 540 may be fully or partially accommodated in the accommodating space. An optical interface 550 is arranged on one end of the optical module, and an electrical interface 543 is arranged on the other end of the optical module 500. The end of the PCB 540 that is further away from the optical interface 550 is constructed as the electrical interface 543 of the optical module 500.

Additionally, the optical module 500 further includes an assembly tolerance absorbing assembly that is connected to the housing. In the fifth exemplary embodiment, the assembly tolerance absorbing assembly is constructed as an adapter 570. The adapter 570 is separately configured from the housing 510, and at least a portion of the adapter 570 is accommodated in the accommodating space. The optical module 500 further includes an optical assembly 560 arranged on the PCB 540. The optical assembly 560 has optical interfaces 551 and 552 that mate to the adapter 570. A gap S between the adapter 570 and the housing 510 is adjustable. After the adapter 570 and the housing 510 are adjusted into position, they are fixed together by means of glue, screw tightening, or soldering. The optical assembly 560 may be integrated onto the PCB 540 as one piece, or it may be removably arranged on the PCB 540, or it may be integrated onto a heat sink as one piece, that is, the optical system, the optical interface, and the circuit board are all fixed to the heat sink. Here, the optical assembly 560 is electrically connected to the PCB 540.

In the fifth embodiment, the adapter 570 is separately configured from the housing 510, and the gap S between the adapter 570 and the housing 510 is adjustable, preventing the problem of misalignment between the adapter 570 and the center of an optical path of the optical assembly 560 caused by manufacturing tolerances of the adapter 570 and/or the housing 510. In this way, the manufacturing tolerances between the adapter 570 and/or the housing 510 are converted into position tolerances of the adapter 570, so that the adapter 570 can, according to the position of the optical assembly 560, move relative to the housing 510, making the optical assembly 560 and the adapter 570 of the optical module 500 very easy to be plugged and unplugged and convenient to assemble.

When the optical assembly 560 is being plugged into the adapter 570, the plugging between the optical assembly 560 and the adapter 570 may be manually controlled. A positioning fixture can be used in addition for positioning in order to assemble the optical assembly 560 and the adapter 570 together.

Further, the optical assembly 560 is configured to include an optical receiving end, an optical transmitting end, and an optical system. The optical assembly 560 may also be configured to include a transceiving chip that integrates optical receiving and optical transmitting.

In the fifth exemplary embodiment, the optical assembly 560 is configured to have two optical interfaces. One of these interfaces is an optical transmitting interface 551, and the other of these interfaces is an optical receiving interface 552. Alternatively, both interfaces may be configured as optical transmitting interfaces or optical receiving interfaces.

The gap S for adjustment exists between the end surfaces of the adapter 570 that are parallel to the plugging direction of the optical interfaces 551 and 552 and the top, bottom, left, and right of the housing 510. In this way, when assembling the adapter 570, the adapter 570 may move in a plurality of directions including up, down, left, and right according to the position of the optical assembly 560.

In this example embodiment, the adapter 570 is fixed to the housing 510 with dispensed glue in between. Other fixing methods may also be used. For example, the adapter 570 may be fixed to the housing 510 by threaded connections in between.

The fifth exemplary embodiment further discloses an assembly method for the aforementioned optical module 500. The assembly method includes the following steps: assembling the optical assembly 560 and the PCB to the housing 510; mating the adapter 570 to the optical interfaces 551 and 552 of the optical assembly 560; and fixing the adapter 570 to the housing 510. Dispensed glue may be used to fix the adapter 570 to the housing 510 when fixing the adapter 570 to the housing 510. Other fixing methods may also be used. For example, the adapter 570 may be fixed to the housing 510 by threaded connections in between. When threaded connection is used as the fixing method, spacers (not illustrated) of corresponding thickness may be placed in the gap S between the adapter 570 and the housing 510 as required.

In other embodiments, the optical assembly 560 may be configured to include one optical interface. Correspondingly, a mating port exists between the adapter 570 and the optical assembly 560. In other words, the optical interface is configured to be an integrated transceiving interface. The interface may also be configured to be an optical transmitting interface only or an optical receiving interface only.

It should be understood that despite the descriptions of embodiments in the specification, each embodiment does not entail only one single independent technical solution. The specification is written this way simply for the sake of clarity. Those skilled in the art should treat the specification as a whole. The technical solutions associated with the embodiments may be combined in appropriate ways to form other embodiments that can be understood by persons of skill in the art.

The series of detailed descriptions above is only intended to provide specific descriptions of feasible embodiments of the present disclosure. The detailed descriptions are not to be construed as limiting the scope of protection for the present disclosure; all equivalent embodiments or changes that are not detached from the techniques of the present disclosure in essence should fall under the scope of protection of the present disclosure.

What is claimed is:

1. An optical module, comprising:
   a housing;
   a heat sink disposed in the housing and thermally connected to the housing; and
   a printed circuit board (PCB) partially fixed to the heat sink,
   wherein the optical module further comprises an optoelectronic chip electrically connected to the PCB and disposed on the heat sink, and
   the PCB is a rigid printed circuit board, one end of the PCB being provided with a gold finger for electrical connection to an external part,
   the heat sink includes a first connecting surface,
   the PCB includes a second connecting surface parallel to the first connecting surface of the heat sink,
   the PCB is directly connected to the heat sink via the second connecting surface of the PCB and the first connecting surface of the heat sink, and
   the optoelectronic chip comprises a laser emitter directly packaged on the heat sink or packaged on a pad of the heat sink.

2. The optical module according to claim 1, wherein
   the optical module further comprises an optical interface at one end thereof and an assembly tolerance absorbing assembly disposed between the optoelectronic chip and the optical interface, and
   the assembly tolerance absorption assembly affects light transmission between the optical interface and the optoelectronic chip.

3. The optical module according to claim 2, further comprising an optical system, the optical system being disposed between the assembly tolerance absorbing assembly and the optoelectronic chip or between the assembly tolerance absorbing assembly and the optical interface.

4. The optical module according to claim 3, wherein the assembly tolerance absorbing assembly comprises a connecting port and at least one optical fiber optically connecting the connecting portion to the optical interface.

5. The optical module according to claim 4, wherein
   the connecting port is fixed on the heat sink and located between the optical system and the optical interface, and
   the optical fiber transmits light emitted from the optical system to the optical interface.

6. The optical module according to claim 5, wherein the other end of the PCB opposite to the gold finger is fixed to the heat sink by glue.

7. The optical module according to claim 6, wherein the optoelectronic chip and the PCB are electrically connected by a gold wire.

8. The optical module according to claim 7, wherein
   the optoelectronic chip comprises a first optoelectronic chip and a second optoelectronic chip, and
   both of the first optoelectronic chip and the second optoelectronic chip are disposed on the heat sink.

9. The optical module according to claim 8, wherein the first optoelectronic chip is a laser emitter and the second optoelectronic chip is a photodiode.

10. The optical module according to claim 9, wherein the first optoelectronic chip is located at the end of the PCB near the optical interface.

11. The optical module according to claim 10, wherein
the optical system comprises a wavelength division multiplexer disposed on the heat sink,
the connecting port comprises a transmitting connecting port that corresponds to an optical transmitting end, and
the transmitting connecting port is connected to the optical interface through an optical fiber.

12. The optical module according to claim 1, wherein the second connecting surface is rigid, and the second connecting surface is fixed to the first connecting surface of the heat sink.

13. An optical module, comprising:
a housing;
a heat sink and a printed circuit board (PCB) disposed in the housing;
an optoelectronic chip disposed on the heat sink; and
an assembly tolerance absorbing assembly disposed in the housing,
wherein one end of the optical module has an optical interface,
the PCB is configured as a rigid board,
the assembly tolerance absorbing assembly is disposed between the optoelectronic chip and the optical interface,
the assembly tolerance absorbing assembly is configured to transmit light between the optical interface and the optoelectronic chip, and
the assembly tolerance absorbing assembly comprises at least one optical fiber optically coupled between the optical interface and the optoelectronic chip.

14. The optical module according to claim 13, wherein one end of the PCB opposite to the optical interface is provided with a gold finger as an electrical interface of the optical module.

15. The optical module according to claim 13, wherein one end of the at least one optical fiber is fixed on the heat sink, and the other end of the at least one optical fiber is connected to the optical interface.

16. The optical module according to claim 15, wherein
the assembly tolerance absorbing assembly further comprises a connecting port,
the connecting port is fixed on the heat sink and connected to the at least one optical fiber, the one end of the at least one optical fiber being fixed on the heat sink via the connecting port, and
light emitted by the optoelectronic chip is transmitted to the optical interface through the connecting port and the at least one optical fiber.

17. The optical module according to claim 13, wherein
the assembly tolerance absorbing assembly comprises an adapter disposed separately from the housing, and
the adapter is mated with the optical interface.

18. The optical module according to claim 17, wherein after the adapter and the housing are adjusted in position, the adapter and the housing are fixed together by glue, screw tightening, or soldering.

19. The optical module of claim 17, wherein a gap for adjustment exists between the adapter and the housing in a direction perpendicular to a plugging direction.

20. The optical module according to claim 13, wherein the optical module further comprises an optical system disposed between the optical interface and the optoelectronic chip.

21. The optical module according to claim 20, wherein a portion of the PCB is fixed to the heat sink by glue.

22. The optical module according to claim 20, wherein
the optical system is disposed between the assembly tolerance absorbing assembly and the optoelectronic chip, and
the optical system transmits light transmitted from the assembly tolerance absorbing assembly to the optoelectronic chip.

23. The optical module according to claim 22, wherein the optical system is disposed on the heat sink.

24. The optical module according to claim 22, wherein
the optical system comprises a lens assembly and a wavelength division multiplexer,
the assembly tolerance absorbing assembly further comprises a connecting port,
the connecting port comprises a transmitting connecting port corresponding to an optical transmitting end, and
the transmitting connecting port and the optical interface are connected by an optical fiber.

25. The optical module according to claim 13, wherein the optoelectronic chip comprises a laser emitter and a photodiode chip.

26. The optical module according to claim 25, wherein the optoelectronic chip and the PCB are electrically connected by a gold wire.

27. The optical module according to claim 13, wherein the optical interface is disposed in the housing.

\* \* \* \* \*